(12) United States Patent
Zhu et al.

(10) Patent No.: US 11,162,978 B2
(45) Date of Patent: Nov. 2, 2021

(54) METHOD OF OPERATING SCANNING THERMAL MICROSCOPY PROBE FOR QUANTITATIVE MAPPING OF THERMAL CONDUCTIVITY

(71) Applicants: Jiahua Zhu, Fairlawn, OH (US); Yifan Li, Akron, OH (US)

(72) Inventors: Jiahua Zhu, Fairlawn, OH (US); Yifan Li, Akron, OH (US)

(73) Assignee: The University of Akron, Akron, OH (US)

( * ) Notice: Subject to any disclaimer, the term of this patent is extended or adjusted under 35 U.S.C. 154(b) by 0 days.

(21) Appl. No.: 16/822,597

(22) Filed: Mar. 18, 2020

(65) Prior Publication Data

US 2020/0300888 A1 Sep. 24, 2020

Related U.S. Application Data

(60) Provisional application No. 62/820,300, filed on Mar. 19, 2019.

(51) Int. Cl.
*G01Q 60/58* (2010.01)
*G01N 25/18* (2006.01)

(52) U.S. Cl.
CPC ............ *G01Q 60/58* (2013.01); *G01N 25/18* (2013.01)

(58) Field of Classification Search
CPC .............................. G01Q 60/58; G01N 25/18
USPC .............................................. 850/1, 5, 13, 50
See application file for complete search history.

(56) References Cited

U.S. PATENT DOCUMENTS

| 5,441,343 A | 8/1995 | Pylkki et al. |
| 6,491,425 B1 | 12/2002 | Hammiche et al. |
| 7,448,798 B1 | 11/2008 | Wang |
| 10,830,792 B2 * | 11/2020 | Chinivaranahalli Shastry ............ G01Q 60/10 |

* cited by examiner

*Primary Examiner* — Nicole M Ippolito
(74) *Attorney, Agent, or Firm* — Renner Kenner Greive Bobak Taylor & Weber

(57) ABSTRACT

A method of operating a scanning thermal microscopy probe to model thermal contact resistance at an interface between a sample and a tip of the probe includes providing a sample to be measured; providing a scanning thermal microscopy probe including a tip; contacting the sample to be measured with the tip; and determining, with a model, a thermal conductivity (k) of the sample from a probe current (I) of the scanning thermal microscopy probe.

19 Claims, 4 Drawing Sheets

METHOD OF OPERATING SCANNING THERMAL MICROSCOPY PROBE FOR QUANTITATIVE MAPPING OF THERMAL CONDUCTIVITY

CROSS REFERENCE TO RELATED APPLICATIONS

This application claims the benefit of U.S. provisional patent application Ser. No. 62/820,300, filed Mar. 19, 2019, which is incorporated by reference herein.

FIELD OF THE INVENTION

The present invention is directed to a method of operating a scanning thermal microscopy probe for quantitative mapping of thermal conductivity, and corresponding systems performing the method.

BACKGROUND OF THE INVENTION

The rise of nanotechnology and rapid development of the microelectronics industry pose an ever increasing challenge of heat dissipation at the microscale and nanoscale levels. Some efforts in this regard have sought to make improved thermally conductive materials. Though, obtaining precise and convenient measurements of thermal conductivity remains a challenge, especially at the microscale and nanoscale levels.

Over the past decades, a few techniques have been developed for measuring thermal conductivity. These include Scanning Thermal Microscopy (SThM), Time-Domain Thermoreflectance (TDTR), Time-domain Differential Raman (TDDR), and Frequency Resolved Raman (FRR). Among these technologies, SThM and TDTR are the most utilized, and only TDTR provides a quantitative calculation result for the thermal conductivity.

SThM has been widely used to characterize the thermal properties of various materials during the past two decades because of its unique combination of high spatial resolution and thermal property analysis. It is widely accepted that SThM results can be used to tell the relative difference of materials in different regions. However, SThM cannot yet provide a quantification profile of the measurement. The major challenge comes from the varied thermal resistance at the tip-sample interface, which greatly influences the overall reading of the thermal signal. By combining other techniques with SThM, such as Spatially Resolved Raman Spectroscopy or Ultra-high Vacuum Scanning Thermal Microscopy, a quantitative profile of thermal conductivity has been achieved from these combinations, but these combinations include very complicated setups.

There remains a need in the art for an improved method for obtaining thermal conductivity via SThM.

SUMMARY OF THE INVENTION

In one embodiment, the present invention provides a method of operating a scanning thermal microscopy probe to model thermal contact resistance at an interface between a sample and a tip of the probe includes providing a sample to be measured; providing a scanning thermal microscopy probe including a tip; contacting the sample to be measured with the tip; and determining, with a model, a thermal conductivity (k) of the sample from a probe current (I) of the scanning thermal microscopy probe.

BRIEF DESCRIPTION OF THE DRAWINGS

Advantages of the present invention will become better understood with regard to the following description, appended claims, and accompanying drawings wherein:

DETAILED DESCRIPTION OF THE ILLUSTRATIVE EMBODIMENTS

One or more embodiments of the present invention are directed to a method of operating a scanning thermal microscopy probe for quantitative mapping of thermal conductivity, and corresponding systems performing the method. The scanning thermal microscopy probe, which may also be referred to as a thermal probe, may be particularly useful for determining, with a model, a thermal conductivity (k) of a sample from a probe current (I) input. A method of operating the scanning thermal microscopy probe includes utilizing the model to determine the thermal conductivity. A microscopy system including the scanning thermal microscopy probe utilizes the method of operating to determine the thermal conductivity.

Figure 1:
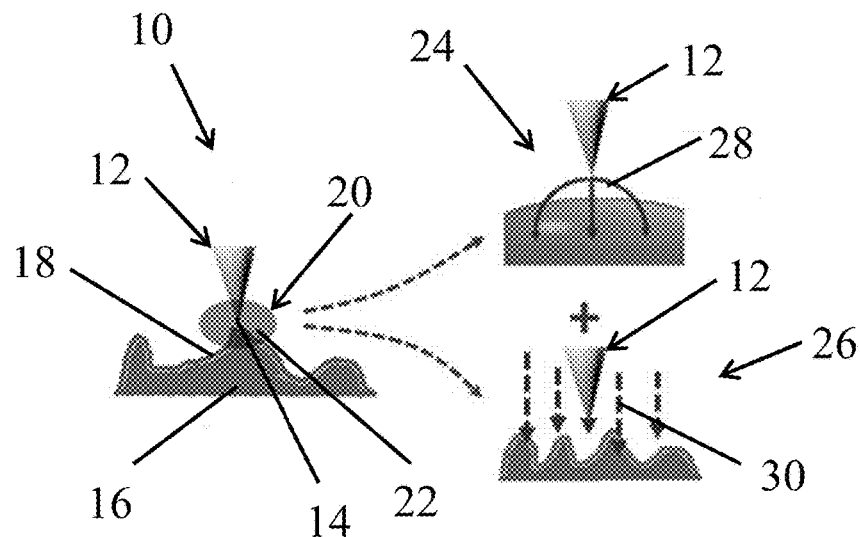
FIG. 1 is a schematic showing a thermal probe tip and operation method according to one or more embodiments of the present invention.

Aspects of one or more embodiments of the present invention can be described with reference to FIG. 1, which shows a method 10 of operating a thermal probe 12, which may also be referred to as a scanning thermal microscopy (SThM) probe 12. Thermal probe 12, particularly a tip 14 thereof, is brought into contact with a sample 16. The surface of the thermal probe 12 is generally smooth.

Sample 16 includes a surface 18 that includes some amount of intrinsic roughness. The SThM probe includes determining a thermal feedback signal by the heat dissipation through sample 16 and the heat dissipation across an interface 20 between tip 14 and sample 16, which may also be referred to as a tip-sample interface 20.

The presence of an air gap 22 between portions of tip 14 and portions of sample surface 18, due to the intrinsic roughness of surface 18, is a major obstacle for quantitative calculation of thermal conductivity with conventional SThM probes. The air gap 22 acts as a thermal resistor which is influenced by many factors at interface 20, including, but not limited to, roughness of surface 18, hardness of surface 18 and intrinsic thermal conductivity of sample 16, and contact force between probe 12 and sample 16.

Understanding and modeling this air gap 22, and the effect of the air gap 22 on the ability of probe 12 to provide a suitable measurement of sample 16, is an aspect of one or more embodiments of the present invention. In that regard, and as suggested above, the interface 20 includes one rough surface, the sample surface 18, and one smooth surface, the probe 12. FIG. 1 shows that the rough sample surface 18 can be further simplified into two parts based on the heat transfer modes at the interface 20. These modes include a macro-contact mode 24 and a micro-contact mode 26. The macro-contact mode 24 includes heat spreading 28 and the micro-contact mode 26 includes heat flux 30.

The macro-contact thermal resistance and the micro-contact thermal resistance are the two major forms of thermal contact resistance (TCR) at the interface 20. The total contact resistance ($R_{cont}$) can be calculated by summing macro-contact resistance ($R_{ma}$) and micro-contact resistance ($R_{mi}$), as shown in equation (1):

$$R_{cont} = R_{ma} + R_{mi} \tag{1}$$

$R_{ma}$ is majorly attributed to the thermal spreading resistance ($R_s$), which is formed due to the non-uniform distribution of heat at the heated side, and, consequently insufficient heat transfer from the heat source. The thermal spreading resistance is defined as the temperature difference between the heat source and the contact area divided by the heat flux, as shown in equation (2):

$$R_s = dT/Q \tag{2}$$

To calculate $R_s$, an isothermal flux tube model can be used. In this model, $R_s$ is a function of spreading resistance factor ($\varphi(\varepsilon)$), radius of macro-contact (a), and effective thermal conductivity ($k_e$), as shown in equation (3):

$$R_s = \varphi(\varepsilon)/2k_e a \tag{3}$$

In equation (3), $\varphi(\varepsilon) = (1-a/b)^{1.5}$, b is the radius of flux tube, $k_e = 2 k k_t/(k+k_t)$. In the present system of tip 14 and sample 16 (i.e. tip-sample interface 20), a is tip radius, b is sample size, and $k_e$ is the effective thermal conductivity across the tip-sample interface 20. Due to the low thermal conductivity of at least certain polymer systems that can be used as the sample 16, that is, $k \ll k_t$, $k_e$ can be simplified from the above equation to $k_e = 2k$. Since the radius of tip 14 is much smaller than the size of sample 16, that is, $a \ll b$, the equation for $R_{ma}$ can be further simplified, as shown in equation (4):

$$R_{ma} = R_s = \frac{\varphi(\varepsilon)}{2k_e a} = \frac{(1-a/b)^{1.5}}{2k_e a} = \frac{1}{4ka} \tag{4}$$

For micro-contact $R_{mi}$, a model that combines an empirical equation can be utilized, as shown in equation (5):

$$R_{mi} = \frac{2H}{\pi k_e F} \frac{\sigma}{m} = \frac{H}{\pi k F} \frac{\sigma}{m} \tag{5}$$

In equation (5), H is micro-hardness, σ is effective roughness, F is contact force, and m is effective slope of the tip and sample. For the present model, H is calculated via a model using Atomic Force Microscopy (AFM) based nanoindentation method. For this model, $\sigma = \sqrt{\sigma_{sample}^2 + \sigma_{tip}^2}$, where $\sigma_{sample}$ is sample surface roughness measured by AFM and $\sigma_{tip}$ is considered as 0, assuming a smooth tip surface. F is the contact force of the tip on the sample surface. $m = \sqrt{m_{sample}^2 + m_{tip}^2}$, where $m_{sample}$ is the sample slope obtained from the original AFM 3D topography images without a flatting process and $m_{tip}$ is considered as 0, assuming a flat tip surface.

After combining the macro-contact thermal resistance and the micro-contact thermal resistance, $R_{cont}$ can be written as shown in equation (6), where $R_{cont}$ is related to thermal conductivity, micro-hardness, roughness of the prepared sample, slope of sample surface, and the loading force of tip during measurement:

$$R_{cont} = R_{ma} + R_{mi} = \frac{1}{4ka} + \frac{H}{\pi k F} \frac{\sigma}{m} \tag{6}$$

As further discussion of the development of the model described herein, aspects of scanning thermal microscopy (SThM) will now be discussed. SThM utilizes nanofabricated thermal probes with resistive elements to achieve high spatial and thermal resolution with a unique signal detection configuration. Based on the working principle, two different measurement modes can be used in SThM. These two modes include temperature contrast mode (TCM) and conductivity contrast mode (CCM). In the TCM mode, the thermal probe is heated at a constant current and then is functioning as a resistance thermometer. More specifically, as the thermal probe scans through a surface with non-uniform distribution of thermal conductivity, the probe temperature varies with the heat flux across the tip-surface interface that is determined by the thermal conductivity of contacting area. In the CCM mode, the thermal probe is used as a resistive heater and sufficient energy is applied to keep a constant probe surface temperature. The probe current is measured as an index of thermal conductivity. For the model described herein, the CCM mode was adopted.

Figure 2:
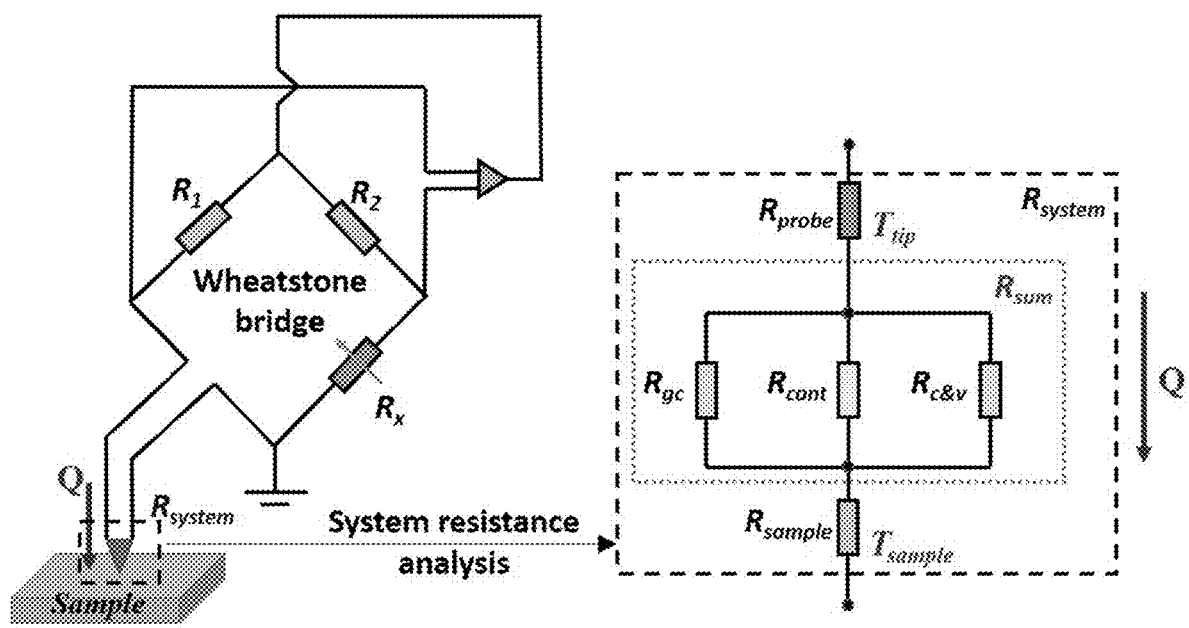
FIG. 2 is a schematic showing a mode diagram for the thermal probe according to one or more embodiments of the present invention.

FIG. 2 shows the diagram of the SThM CCM mode (Wheatstone bridge) and the analysis of the thermal resistances in the system. The Wheatstone bridge feeds back, adjusts, and balances the bridge voltage to measure probe current.

The fixed resistors $R_1$ and $R_2$ form one arm of the bridge while the rheostat $R_x$ and the $R_{system}$ form the other arm of the bridge. Since $R_1$ and $R_2$ are fixed, $R_x$ can be adjusted to balance the bridge once $R_{system}$ changes. The output voltage is in direct proportion to the current through the bridge and thus the probe current. As shown in FIG. 2, $R_{system}$ is the summation of $R_{probe}$, $R_{sum}$, and $R_{sample}$. $R_{probe}$ can be neglected since it is made of highly conductive metals and its thermal resistance is much smaller than $R_{sum}$ and $R_{sample}$. $R_{sum}$ is contributed by three resistance parts in parallel connection: gas conduction ($R_{gc}$), contact ($R_{cont}$), and convection and radiation ($R_{c\&v}$). In most cases, $R_{gc}$ and $R_{c\&v}$ are orders of magnitude higher than $R_{cont}$. Therefore, $R_{sum}$ can be considered approximately the same as $R_{cont}$.

Considering the total energy balance, the energy can be represented as Q=UI, where U is the voltage of Wheatstone bridge and the I is the probe current. In view of this total energy balance, the energy into the electrical circuit system will be dissipated through two different ways. One is the heat generation at the fixed resistors ($Q_F$) and the other is the heat flux through the tip-surface contacts ($Q_R$). This is shown in equation (7):

$$Q = UI = Q_F + Q_R \tag{7}$$

According to Fourier's law, $Q_R$ can be written by equation (8):

$$Q_R = \Delta T/R \qquad (8).$$

In equation (8), $\Delta T = T_{tip} - T_{sample}$, and $R = R_{sample} + R_{cont}$. $T_{tip}$ is the temperature of the tip and $T_{sample}$ is the temperature of the sample surface. $R_{sample}$ can be obtained by a moving heat source method, represented as $$R_{sample} = \frac{1}{\pi r_0 k}.$$

Here, $r_0$ is the radius of the heat source which is equal to the tip radius, which may be 100 nm, and k is the thermal conductivity of sample. Combining equations (7) and (8) gives equation (9):

$$Q = UI = \frac{(T_{tip} - T_{sample})}{\frac{1}{\pi r_0 k} + R_{cont}} + Q_F. \qquad (9)$$

By substituting equation (6) into equation (9), equation (10) is obtained:

$$I = \frac{(T_{tip} - T_{sample})}{U} \frac{1}{\frac{1}{\pi r_0 k} + \frac{1}{4ka} + \frac{H}{\pi kF} + \frac{\sigma}{m}} + \frac{Q_F}{U}. \qquad (10)$$

Since $T_{tip}$ is maintained at a constant temperature during testing, $T_{tip} - T_{sample}$ will remain a constant. Meanwhile, the applied voltage (U) is also fixed during the testing. At specified testing conditions, equation (10) can be rewritten into equation (11):

$$I = \frac{A}{\frac{1}{\pi r_0 k} + \frac{1}{4ka} + \frac{H}{\pi kFm} \sigma} + B. \qquad (11)$$

In equation (11), $$A = \frac{(T_{tip} - T_{sample})}{U} \text{ and } B = \frac{Q_F}{U},$$

where A and B are constants relating to instrument parameters. From equation (11), the probe current (I) is related to the thermal conductivity (k), micro-hardness (H), sample surface roughness (σ), loading force of tip (F) and slope of sample and tip (m). H, σ and m can be characterized by AFM, and F is a set value that can be adjusted as desired. Thus, a relationship between probe current I and thermal conductivity k can be constructed after identifying all other parameters in equation (11).

Equation (11), along with the discussion in the Examples below, provides for quantitative determination of thermal conductivity based on probe current. Mapping down to microscale or even nanoscale can be realized by using the model from this invention. As discussed further herein, the thermal contact resistance (TCR) can be mathematically derived into either a linear or a non-linear model based on the interfacial micro-characteristics. The models have the capability to predict TCR for a wide range of different surfaces with satisfactory accuracy. Since the models discussed herein are developed based on a comprehensive understanding of intrinsic interfacial features, including sample roughness and micro-hardness, contacting force, and the contacting area, the models can be extended to study a wide range of material systems.

As mentioned above, one or more embodiments of the invention include a microscopy system including the scanning thermal microscopy probe, where the system utilizes the method of operating to determine the thermal conductivity.

Other aspects of a microscopy system or of scanning thermal microscopy (SThM) are generally known to a person skilled in the art. As examples, U.S. Pat. Nos. 5,441,343; 6,491,425; and 7,448,798 are each incorporated herein by reference for this purpose.

In one or more embodiments, a microscopy system or a method of operating the scanning thermal microscopy probe may be devoid of another microscopy technique. In one or more embodiments, a microscopy system or a method of operating the scanning thermal microscopy probe may be devoid of Spatially Resolved Raman Spectroscopy. In these or other embodiments, a microscopy system or a method of operating the scanning thermal microscopy probe may be devoid of Ultra-high Vacuum Scanning Thermal Microscopy.

In one or more embodiments, a method of operating the scanning thermal microscopy probe may include developing a model and verifying the model with a particular substrate. Following the verification step, the model may be further developed based on the verification step.

In one or more embodiments, the loading force of the tip may be in a range of from about 1 nN to about 7 nN, and in other embodiments, from about 1.97 nN to about 5.97 nN. In one or more embodiments, the loading force of the tip may be 1.97 nN, in other embodiments, about 3.97 nN, and in other embodiments, about 5.97 nN.

In one or more embodiments, the tip radius may be in a range of from about 10 nm to about 200 nm, and in other embodiments, from about 50 nm to about 150 nm. In one or more embodiments, the tip radius may be about 100 nm. In one or more embodiments, the tip radius may be less than 200 nm, in other embodiments, less than 150 nm, and in other embodiments, less than 100 nm.

In one or more embodiments, the substrate sample may be a polymer system made of epoxy or polydimethylsiloxane (PDMS).

In addition to any advantages discussed above, the present scanning thermal microscopy probe and method of operation may offer one or more other advantages. The method of operation may offer a mathematical description of the thermal contact resistance at the tip-sample interface. The method of operation may enable quantitative characterization of thermal conductivity by SThM. This feature gives SThM a new capability in quantitative thermal analysis with spatial resolution down to the nanometer scale, which is promising to quantify the thermal conduction across interfaces within composites, multi-layer membranes, microelectronics, among other suitable applications. Other examples include thermal conductivity distribution of heterogeneous materials can be precisely mapped at nanometer resolution, and the thermal conduction across nanointerface of composites can be quantified.

As should be appreciated by one of ordinary skill in the art, the present invention offers an improvement in the functioning of scanning thermal microscopy technology.

Moreover, the utilization of a scanning thermal microscopy probe is a practical application of any mathematical model discussed herein.

In light of the foregoing, it should be appreciated that the present invention significantly advances the art by providing an improved scanning thermal microscopy probe and method of operation. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

EXAMPLES

Two polymer systems, polydimethylsiloxane (PDMS) and epoxy, were employed to verify the model in correlating the probe current and the thermal conductivity by considering the surface features at nanoscale.

Sample Preparation—PDMS

PDMS (sylgard-184) was provided by Dow Corning. PDMS films were prepared by mixing different ratios of the base monomer and the curing agent. The percentage of the curing agent was fixed at different weight percentages of 2, 5, 10, 20, 40 and 50 (wt. %). The PDMS base monomer and curing agent were stirred for 20 mins at room temperature and then cured in a petri dish for 4 hours at 80° C. As referred to later herein, the PDMS samples were named PDMS-X (X=2, 5, 10, 20, 40 and 50 wt. %).

Sample Preparation—Epoxy

Epoxy resin (826 RS) was purchased from HEXION Inc. The curing agent (JEFFAMINE T403) was provided by Huntsman Corporation. Epoxy films were prepared by mixing different loading weight percentages of the curing agent of 10, 20, 30, 40 and 50 (wt. %). The well mixed specimens were placed in a rubber mold for curing. Before curing, the samples were degassed in a vacuum oven for 30 mins. Then the samples were cured at 80° C. for 4 hours in a regular oven. As referred to later herein, the epoxy samples were named Epoxy-X (X=10, 20, 30, 40 and 50 wt. %).

Sample Testing

PDMS-20% and Epoxy-30% were selected to test the model and generate useful information for further model validation. The microscopic characterization of both PDMS-20% and Epoxy-30% by AFM-SThM were obtained. The original SThM probe current image was used to calculate the average probe current of the entire surface. The average probe current value was found. The 3D topography image without flatting process and the corresponding height line profile with calculated slope value m were found. The topography and thermal mapping images of PDMS-20% were found. Similar characterizations were carried out on Epoxy-30% and the results were found. All the parameters used for model testing and the calculated $R_{ma}$ and $R_{mi}$ for both PDMS and Epoxy are summarized in Table 1.

As seen in Table 1, $R_{ma}$ is about two orders of magnitude larger than that of $R_{mi}$ in PDMS-20%. Thus, the contribution of $R_{ma}$ in TCR can be neglected for PDMS. That is, the $R_{cont}$ can be considered the same as $R_{ma}$, which is only related to the thermal conductivity of the sample and tip radius. Thus, equation (11) can be rewritten into equation (12) for PDMS, where a linear relationship between probe current I and thermal conductivity k can be found:

$$I = \frac{A}{\frac{1}{\pi r_0 k} + \frac{1}{4ka}} + B = A \cdot C \cdot k + B \qquad (12)$$

$$C = \frac{4a\pi r_0}{4a + \pi r_0} = \frac{4a\pi}{4 + \pi}$$

where $(r_0 = a)$

With regard to the epoxy, Epoxy-30% showed different surface features as compared to PDMS-20%, especially the surface roughness as summarized in Table 1. The $R_{mi}$ is in direct proportion to the surface roughness (equation 5) that leads to a comparable $R_{ma}$ and $R_{mi}$. Therefore, none of these terms in equation (10) can be neglected in epoxy system.

Back to the heat transport principle between two solid materials, roughness, hardness, and contact force are the three major factors influencing the TCR at the interface. Here, contact force was a pre-setting constant value during the test. The hardness value was at the same order of magnitude for both the PDMS and Epoxy systems. The varied surface roughness was the major reason for the dramatically different $R_{mi}$ in both materials. These results indicate that surface roughness could be the dominating factor for TCR. A sample surface with a small roughness leads to a linear relationship between probe current and thermal conductivity. But for a surface with large roughness, probe current is related to thermal conductivity and other factors as well, mainly micro-hardness and roughness.

Additional Discussion

In the above, two different models were developed for PDMS and epoxy systems to correlate probe current and thermal conductivity by analyzing the interfacial TCR. As mentioned above, more specimens with varied base to curing agent ratios were tested. The features of PDMS and epoxy resins characterized by AFM and SThM were summarized. In general, the surface roughness of all the PDMS samples was much smaller than that of epoxy, as evidenced by the scales of topography images. It is worth noticing that the topography pattern of the samples showed certain similarity to the pattern of probe current distribution. This was more apparent in epoxy samples where larger surface roughness was observed. Such similar pattern of topography and probe current indicated the influence of surface geometry on interfacial thermal transport. According to the working prin-

TABLE 1

Summarized parameters for PDMS and epoxy systems.

| Materials | k (Wm$^{-1}$·K$^{-1}$) | a (nm) | H (kPa) | σ (nm) | F (nN) | m | $R_{ma}$ (WK$^{-1}$) | $R_{mi}$ (WK$^{-1}$) |
|---|---|---|---|---|---|---|---|---|
| PDMS-20% | 0.203 | 100 | 25.6 | 1.37 | 1.97 | 0.19 | 1.23E7 | 1.47E5 |
| Epoxy-30% | 0.235 | 100 | 33.0 | 202.03 | 1.97 | 0.19 | 1.06E7 | 2.18E7 | ciple of SThM, topography capturing system and probe current signal feedback loop are two independent channels and they are not supposed to interfere with each other. Because probe current is a result of the combined action of sample thermal conductivity and $R_{cont}$, the only explanation for the topography-related probe current distribution is that the heat flux caused by TCR is large enough and poses great influence on the final observation in thermal image. In other words, the feedback signal was mostly contributed by the heat flux of the tip-sample interface rather than from the sample itself. Based on the model discussed herein, larger roughness value means higher TCR and thus lower probe current. For the PDMS system, the surface roughness was much smaller (<2 nm) and no apparent correlation could be found between the topography image and the thermal image. Thus, the probe current was randomly distributed without any specific patterns. All the samples showed similar slope value (m) of around 0.2. The small difference of m values was not expected to impact further calculation significantly.

Revised Probe Current—PDMS

Figure 3:
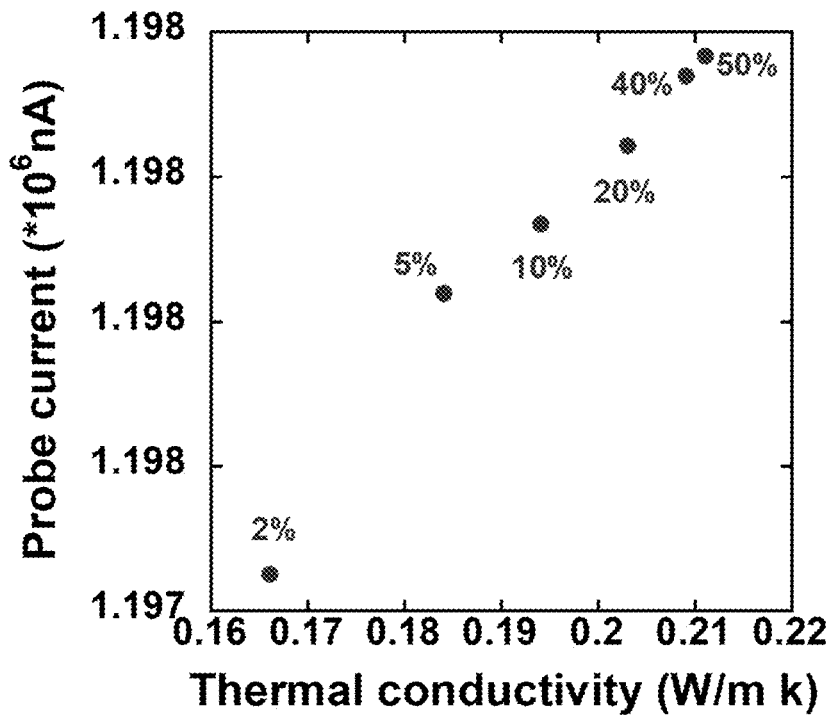
FIG. 3 is a graph showing results of thermal conductivity versus probe current for operation of the thermal probe with a PDMS system.

The probe current and bulk thermal conductivity of PDMS were measured by SThM CCM mode and TCi respectively. Both of them increased with increasing load percentage of curing agent. The micro-hardness and surface roughness were presented as a function of the percentage of curing agent, where a gradual increase of both parameters was observed. The variation of the hardness and roughness was still at the same level of magnitude. With that, equation (12) could be used for all the six PDMS samples and thus it was expected that the probe current and thermal conductivity of the materials should follow a linear relationship. To verify the model, the probe current against the thermal conductivity was plotted. Since the variation of the probe current was very small, as shown in FIG. 3, the differentiation of the readings was difficult. Therefore, a revised probe current (I*) was used and the data was replotted, as shown in FIG. 4, using equation (13):

$$I^*(uA) = \frac{I(nA) - 1.19 * 10^6 nA}{1000}. \tag{13}$$

Figure 4:
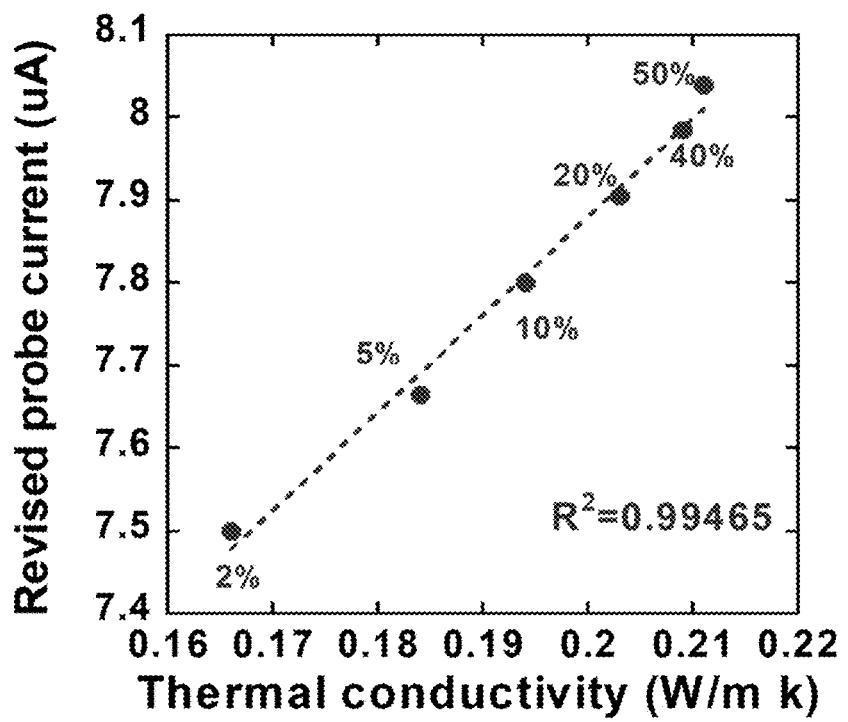
FIG. 4 is a graph showing results of thermal conductivity versus revised probe current for operation of the thermal probe with the PDMS system.

FIG. 4 shows a highly linear relationship ($R^2 > 0.99$) between I* and thermal conductivity. Such results demonstrate a solid linear correlation between the microscale probe current and the macroscale thermal conductivity. The proposed model well describes such relationship and can be extended to predict thermal conductivity based on microscale measurements.

Non-Linear—Epoxy

Figure 5:
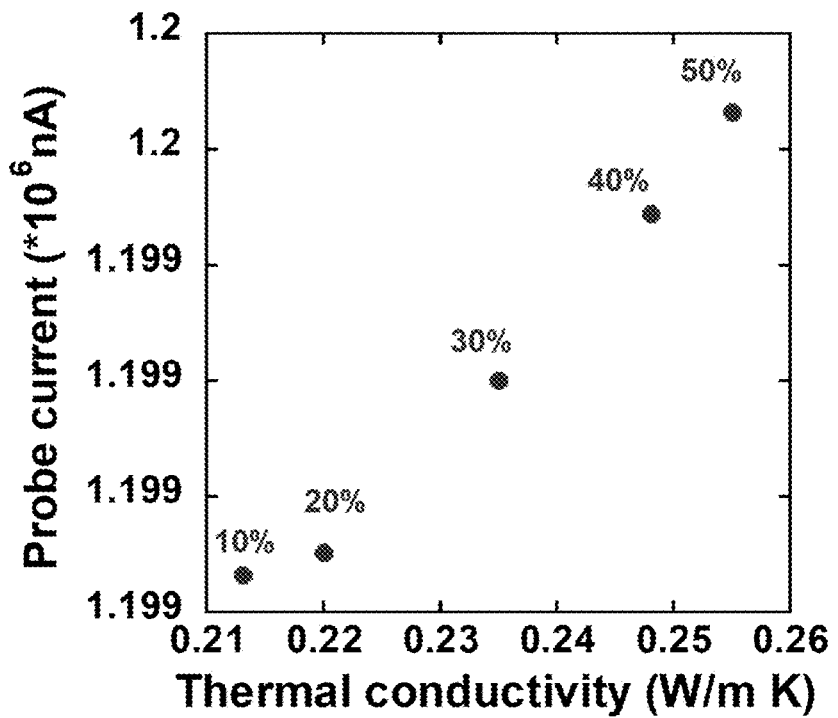
FIG. 5 is a graph showing results of thermal conductivity versus probe current for operation of the thermal probe with an epoxy system.
Figure 6:
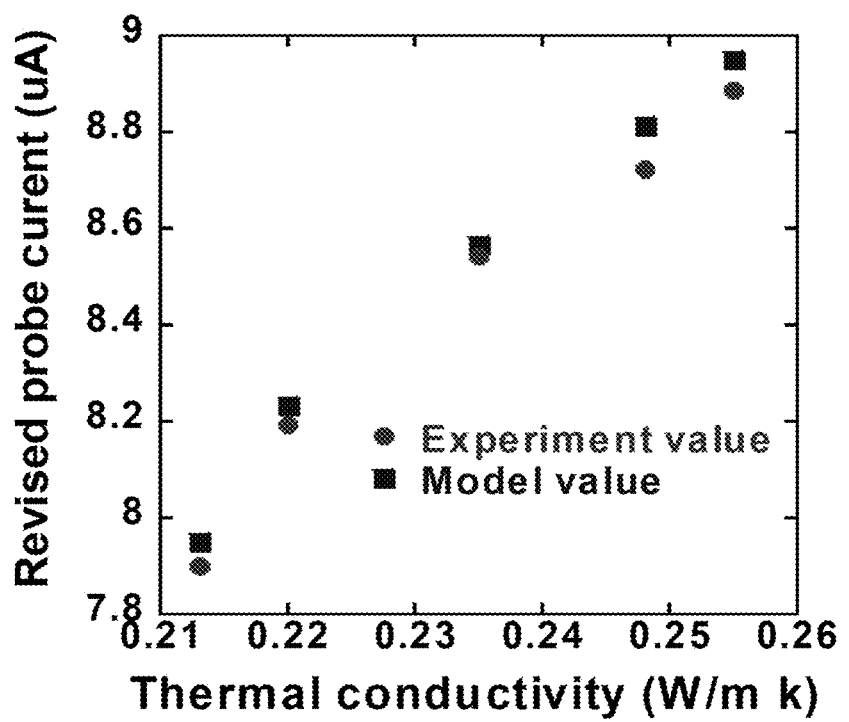
FIG. 6 is a graph showing results of thermal conductivity versus revised probe current for operation of the thermal probe with the epoxy system.

Similar to the PDMS system, the results of the epoxy systems were summarized and characterized. Compared to the 30% curing agent system, both the micro-hardness and the roughness values of the other 4 epoxy samples are at the same order of magnitude. Therefore, the model cannot be simplified into linear form and equation (11) was used to model tip-surface thermal transport for epoxy. FIG. 5 provides a relationship between probe current and thermal conductivity, which does not follow a liner pattern. Since micro-contact resistance cannot be neglected in equation (11), probe current I is not only related to thermal conductivity; other parameters should be considered as well. Taking the instrument parameters A and B from PDMS (A is slope, and B is intercept from the linear fitting) into the epoxy model, a simplified relationship can be constructed between probe current and thermal conductivity. A good consistency of measured and calculated thermal conductivity was found with less than 5% error, as shown in FIG. 6.

Varied Contact Force

All the previous measurements were carried out at a loading force of 1.97 nN. The variation of loading force will change the interfacial contact and thus heat transport across the contacting interface. The robustness of the developed models was tested at different loading force conditions. Two other sets of loading forces were selected: 3.97 and 5.97 nN. The probe currents were collected at specified loading force conditions on all the samples. At the same time, the probe current was calculated from the developed models by substituting the force value.

Varied Contact Force—PDMS

Figure 7:
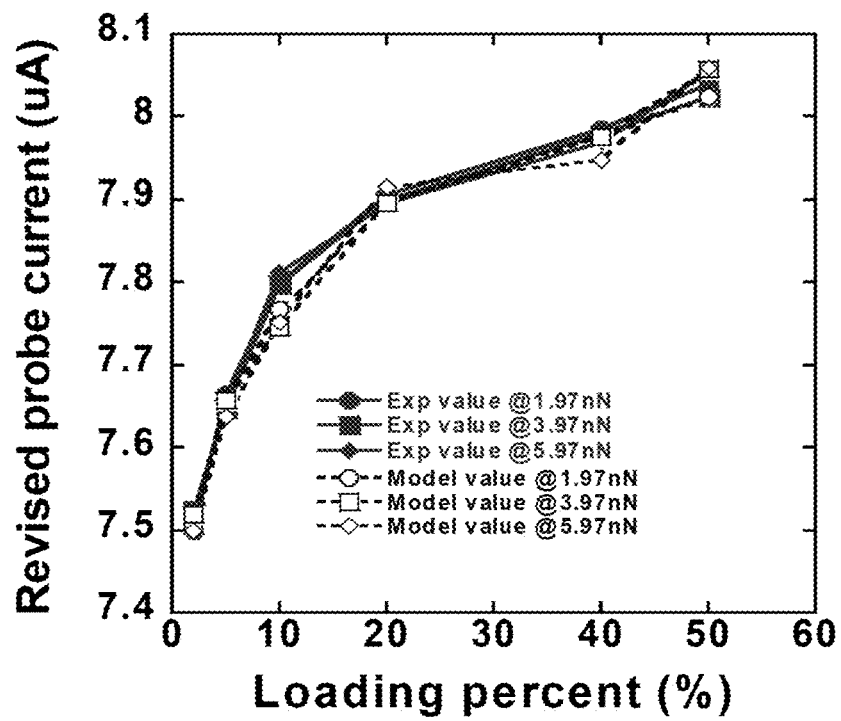
FIG. 7 is a graph showing results of curing agent loading percentage versus revised probe current for the PDMS system at various tip loading forces.

FIG. 7 gives the comparison of the revised probe current from both the experiment and model prediction for PDMS at three different loading force conditions. It was observed that the majority of the data points are overlapped at each loading percent indicating the negligible influence of loading force on the probe current measurement of PDMS as well as the robustness of the model at different testing conditions. These results could be expected since the loading force only affects the $R_{mi}$ in the model and $R_{mi}$ can be neglected for PDMS system. As a result, the changes of loading force F do not influence the probe current measurement.

Varied Contact Force—Epoxy

Figure 8:
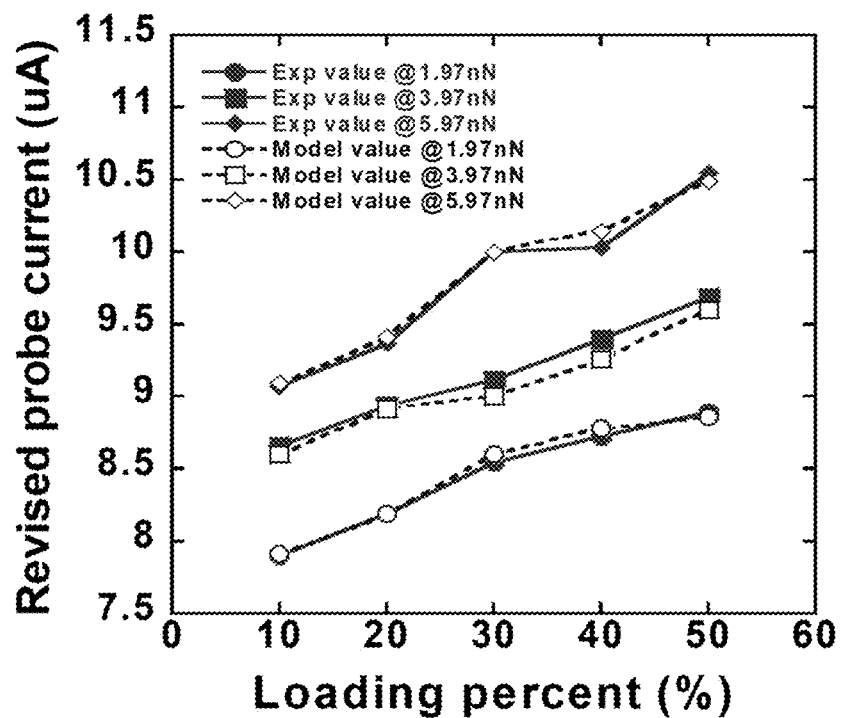
FIG. 8 is a graph showing results of curing agent loading percentage versus revised probe current for the epoxy system at various tip loading forces.

FIG. 8 shows the comparison of the experiment and model probe current values for epoxy. In general, the model and experimental results followed a very similar trend at different loading forces indicating the good adaptability of the epoxy model. However, the amplitude of the probe current increased with increasing loading force. By increasing the loading force, a better interfacial contact can be expected, especially on a rough surface. As a result, the thermal resistance at the interface can be reduced by a tight contact and thus a larger probe current across the interface. In the developed epoxy model, the increase of loading force F decreases the term of $R_{mi}$ and this increases the probe current I.

Based on these results, it can be concluded that the models discussed above are reliable to correlate probe current and thermal conductivity for polymer materials with different surface features (low roughness and high roughness).

What is claimed is:

1. A method of operating a scanning thermal microscopy probe to model thermal contact resistance at an interface between a sample and a tip of the scanning thermal microscopy probe, the method comprising:
    providing a sample to be measured;
    providing a microscopy probe including a tip, the microscopy probe consisting of a scanning thermal microscopy probe;
    contacting the sample to be measured with the tip; and
    determining, with a model, a thermal conductivity (k) of the sample from a probe current (I) of the scanning thermal microscopy probe,
    wherein the method is devoid of Spatially Resolved Raman Spectroscopy and Ultra-high Vacuum Scanning Thermal Microscopy.

2. A microscopy system performing the method of claim 1.

3. A method of operating a scanning thermal microscopy probe to model thermal contact resistance at an interface between a sample and a tip of the scanning thermal microscopy probe, the method comprising:

providing a sample to be measured;
providing a scanning thermal microscopy probe including a tip;
contacting the sample to be measured with the tip; and
determining, with a model, a thermal conductivity (k) of the sample from a probe current (I) of the scanning thermal microscopy probe,
wherein the model is $$I = \frac{A}{\frac{1}{\pi r_0 k} + \frac{1}{4ka} + \frac{H}{\pi k F}\frac{\sigma}{m}} + B$$

where I is current of the scanning thermal microscopy probe, A and B are constants, $r_0$ is radius of the tip, k is thermal conductivity, a is radius of macro-contact, H is micro-hardness of the sample, F is loading force of the tip, $\sigma$ is surface roughness of the sample, and m is slope of the sample and the tip.

4. The method of claim 3, wherein the sample to be measured includes epoxy.

5. The method of claim 3, further comprising a step of determining H, $\sigma$, and m by Atomic Force Microscopy (AFM).

6. The method of claim 3, wherein the loading force F is in a range of from about 1 nN to about 7 nN.

7. The method of claim 3, wherein the loading force F is about 1.97 nN.

8. The method of claim 3, wherein the radius of the tip is from about 50 nm to about 150 nm.

9. The method of claim 3, wherein the radius of the tip is about 100 nm.

10. The method of claim 3, wherein the method is devoid of Spatially Resolved Raman Spectroscopy and Ultra-high Vacuum Scanning Thermal Microscopy.

11. A microscopy system performing the method of claim 3.

12. A method of operating a scanning thermal microscopy probe to model thermal contact resistance at an interface between a sample and a tip of the scanning thermal microscopy probe, the method comprising:
providing a sample to be measured;
providing a scanning thermal microscopy probe including a tip;
contacting the sample to be measured with the tip; and
determining, with a model, a thermal conductivity (k) of the sample from a probe current (I) of the scanning thermal microscopy probe,
wherein the model is $$I = \frac{A}{\frac{1}{\pi r_0 k} + \frac{1}{4ka}} + B = A \cdot C \cdot k + B$$

where $$C = \frac{4a\pi r_0}{4a + \pi r_0} = \frac{4a\pi}{4 + \pi},$$

where $(r_0 = a)$, where I is current of the scanning thermal microscopy probe, A and B are constants, $r_0$ is radius of the tip, k is thermal conductivity, and a is radius of macro-contact.

13. The method of claim 12, wherein the sample to be measured includes polydimethylsiloxane (PDMS).

14. The method of claim 12, wherein the loading force F is in a range of from about 1 nN to about 7 nN.

15. The method of claim 12, wherein the loading force F is about 1.97 nN.

16. The method of claim 12, wherein the radius of the tip is from about 50 nm to about 150 nm.

17. The method of claim 12, wherein the radius of the tip is about 100 nm.

18. The method of claim 12, wherein the method is devoid of Spatially Resolved Raman Spectroscopy and Ultra-high Vacuum Scanning Thermal Microscopy.

19. A microscopy system performing the method of claim 12.

* * * * *